United States Patent [19]

Kamiyama et al.

[11] Patent Number: 5,146,162

[45] Date of Patent: Sep. 8, 1992

[54] ENGINE SPEED MEASURING DEVICE WITH PLURAL COUNTERS FOR AVERAGING ANGULAR VELOCITY

[75] Inventors: Hideyuki Kamiyama, Yamato; Masahiro Sasaki, Yokohama; Youji Oki, Fuchu, all of Japan

[73] Assignee: Stanley Electric Company, Ltd., Japan

[21] Appl. No.: 604,704

[22] Filed: Oct. 26, 1990

[30] Foreign Application Priority Data

Nov. 27, 1989 [JP] Japan .................................. 1-304726

[51] Int. Cl.[5] ...................... G01P 3/481; G01P 3/489; G01R 23/10
[52] U.S. Cl. .................................. 324/166; 324/78 D; 364/565
[58] Field of Search ...................... 324/160, 166, 78 R, 324/78 D; 364/484, 565; 377/19, 24; 361/240

[56] References Cited

U.S. PATENT DOCUMENTS

| | | | |
|---|---|---|---|
| 3,757,167 | 9/1973 | Yoshikawa et al. | 324/166 X |
| 4,434,470 | 2/1984 | Thomas et al. | 324/166 X |
| 4,485,452 | 11/1984 | Cording et al. | 324/166 X |
| 4,527,248 | 7/1985 | Takase et al. | 324/160 X |
| 4,794,551 | 12/1988 | Yoshida | 324/166 X |
| 4,885,710 | 12/1989 | Hersberger et al. | 324/166 X |
| 4,977,525 | 12/1990 | Blackwell | 324/166 X |

FOREIGN PATENT DOCUMENTS

| | | | |
|---|---|---|---|
| 0109867 | 6/1984 | Japan | 324/166 |
| 0003555 | 1/1985 | Japan | 324/166 |

Primary Examiner—Gerard R. Strecker
Attorney, Agent, or Firm—Dykema Gossett

[57] ABSTRACT

In the revolution frequency indication apparatus in which the revolution frequency of a rotating body is measured and indicated according to a sensor pulse obtained from a revolution sensor mounted on said rotating body or its surrounding, a revolution frequency indication apparatus comprising an indication updating time counter circuit which counts predetermined indication updating time intervals, and a revolution frequency measurement portion which measures the revolution frequency of said rotating body by means of a sensor pulse entered within a measurement time interval of said counter circuit.

2 Claims, 2 Drawing Sheets

4: Revolution frequency measurement portion

11 : Rotating body
12 : Axis of revolution
13 : Revolution sensor

ENGINE SPEED MEASURING DEVICE WITH PLURAL COUNTERS FOR AVERAGING ANGULAR VELOCITY

BACKGROUND OF THE INVENTION (1) Field of the Invention

The present invention relates to a revolution frequency indication apparatus which indicates the revolution frequency of a rotating body by means of a revolution sensor mounted on said rotating body or its surrounding, and indicates a measured result.

(2) Description of the Prior Art

With a conventional tachometer namely a speed indication apparatus known in the prior art, the revolution frequency of a rotating body is measured while a measured result being indicated on an indicator. At that time, revolution sensors are mounted on, for example, said rotating body or its surrounding and generate the same number of pulses as the number of said revolution sensors when said rotating body revolves by one turn. Thereby, the revolution frequency of the rotating body is measured and indicated according to the time intervals of generated pulses.

FIG. 5 shows the timing of output pulses from a revolution sensor and the indication of a revolution frequency with a conventional revolution frequency indication apparatus known in the prior art. As shown in FIG. 5, a time to an input pulse (time interval of pulses) is measured while defining and indicating a revolution frequency of the rotating body according to a measured time interval.

With such a conventional revolution frequency indication apparatus as described above and known in the prior art, however, there was a problem that indicated values of revolution frequencies often varied so quickly when the frequencies were high that a supervisor could not ascertain what the frequencies really were, because the time of updating the indication depended on the duration of a sensor pulse (pulse time) generated by the revolution sensor. There was also another problem with such an apparatus known in the prior art that a zero ("0") frequency could not be indicated when the rotating body suddenly stopped, because each measurement cycle could be completed only after two pulses were entered.

SUMMARY OF THE INVENTION

The present invention has been achieved aiming at solving these problems and offering such a revolution frequency indication apparatus that indicated values do not fluctuate, and a zero frequency can be indicated when the rotating body stops.

The revolution frequency indication apparatus according to the present invention is composed as follows : a. In the revolution frequency indication apparatus in which the revolution frequency of a rotating body is measured and indicated according to a sensor pulse obtained from a revolution sensor mounted on said rotating body or its surrounding, the revolution frequency indication apparatus is provided with an indication updating time counter circuit which counts predetermined indication updating time intervals, and a revolution frequency measurement portion which measures the revolution frequency of said rotating body by means of a sensor pulse entered within a measurement time interval of said counter circuit.

b. In the revolution frequency indication apparatus specified in a. above, the apparatus is provided with a zero-revolution detection circuit which detects a zero-revolution when inputting of said sensor pulse stops, and indicates zero.

c. In the revolution frequency indication apparatus specified in a. or b. above, said revolution frequency measurement portion measures the revolution frequency of the rotating body by calculating a mean value of time intervals of the sensor pulses. d. In the revolution frequency indication apparatus specified in a. or b. above, said revolution frequency measurement portion measures the revolution frequency of the rotating body in an indication updating time period, according to a minimum value of the time intervals.

With a revolution frequency indication apparatus according to the present invention, the revolution frequency of a rotating body is measured and indicated according to sensor pulses generated in and entered from revolution sensors within a predetermined indication updating time interval. Therefore, indicated detail is updated every predetermined indication time interval. In addition, said apparatus can indicate a zero frequency by adding a zero-revolution detection circuit.

BRIEF DESCRIPTION OF THE ACCOMPANYING DRAWINGS

DETAILED DESCRIPTION OF PREFERRED EMBODIMENTS

Figure 1:
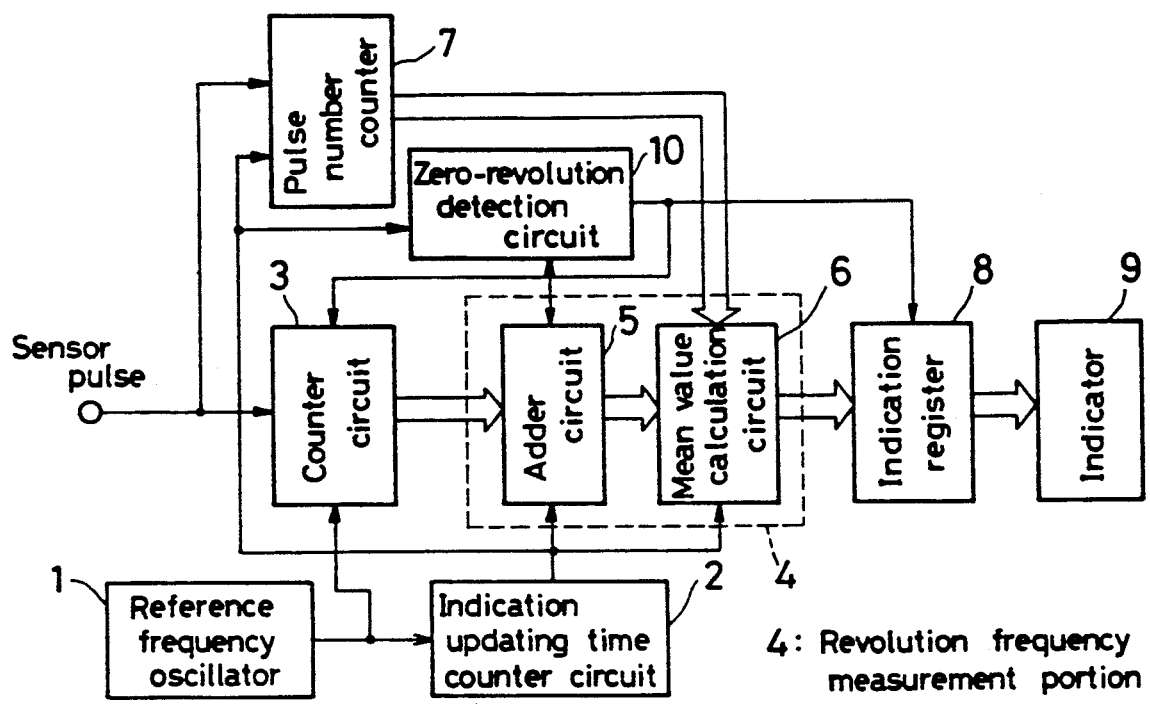
FIG. 1 is the block diagram showing an embodiment of the present invention.

FIG. 1 is the block diagram showing the circuit composition of an embodiment of the revolution frequency indication apparatus according to the present invention. Reference numerals in FIG. 1 represent various devices as follows :

1 for a reference frequency oscillator which generates reference pulses a standard frequency of said apparatus; and 2 for an indication time updating counter circuit which counts predetermined indication time updating time intervals and more explicitly, said counter circuit counts said reference pulses and, when the number of counted pulses arrives in correspondence to a predetermined indication time updating interval, the counter issues a trigger signal to a peripheral circuit while the counter circuit begins to count up by itself from "0". Numeral 3 of FIG. 1 represents a counter circuit which counts the said reference pulses when a sensor pulse is entered from a revolution sensor not illustrated in FIG. 1, and temporarily stops counting when next pulse is entered. Numeral 4 denotes a revolution frequency measurement portion which measures the revolution frequency of the rotating body by means of sensor pulses entered within said indication updating time interval, and comprises an adder circuit 5 and a mean value calculation circuit 6. Thus, the mean value of time intervals between the sensor pulses obtained from the revolution sensor is calculated to measure the revolution frequency of the rotating body. Numeral 7 indicates a pulse number counter to count the number of sensor pulses generated in the revolution sensors which issues a counted result to the mean value calculation circuit 6 according to a trigger signal sent from said indication time updating time counter circuit 2, while clearing it to zero. Numerals 8 and 10 stand for an indication register and a zero-revolution detection circuit; the former indicates the revolution frequency of the rotating body according to an output from the revolution frequency measurement portion 4 while the latter, i. e., the zero-revolution detection circuit 10 detects a zero-revolution state when inputting of sensor pulses stops, and indicates a zero.

Figure 2:
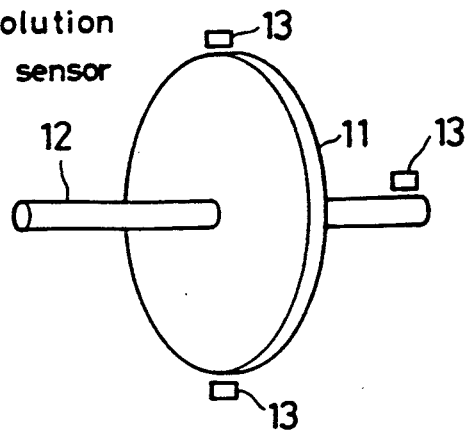
FIG. 2 is a view describing revolution sensor mounting positions.

FIG. 2 indicates the positions where said revolution sensors are mounted; one or more sensors are mounted on a rotating body 11, or an axis 12 and revolution sensor 13 or measurement object or its surroundings.

Next, the operation of such an apparatus is explained in the following:

Said revolution sensor 13 comprises such a sensor as magnetic or photo sensors, and generates one or more sensor pulses when a measurement object rotating body 11 revolves one turn. When the counter circuit 3 receives one of these sensor pulses, it begins to count the reference pulses of the reference frequency oscillator 1 starting from "0" and, when it receives a next sensor pulse, it immediately stops the counter while issuing a counted value at that time to the adder circuit 5. At the same time, the counter circuit 3 begins to count said reference pulses again from "0" until a next sensor pulse is entered.

On the other hand, the pulse number counter 7 counts the number of sensor pulses sent from the revolution sensor 13 and issues a counted result to the mean value calculation circuit 6 according to a trigger sent from the indication updating time counter circuit 2, while clearing it to zero. When the mean value calculation circuit 6 receives a trigger signal from the indication updating time counter circuit 2, it divides a counted value of pulses as added by adder by adder circuit 5 at a predetermined indication updating time, by a number of pulses, as entered from the pulse number counter 7. The divided result is then issued to the indication register 8 as a measurement result. The indication register 8 outputs the measurement result into the indicator 9 to indicate the revolution frequency of the rotating body 11.

The zero-revolution detection circuit 10 resets the indication register 8 and the counter circuit 3 to zero when said adder circuit 5 stores zero.

Figure 3:
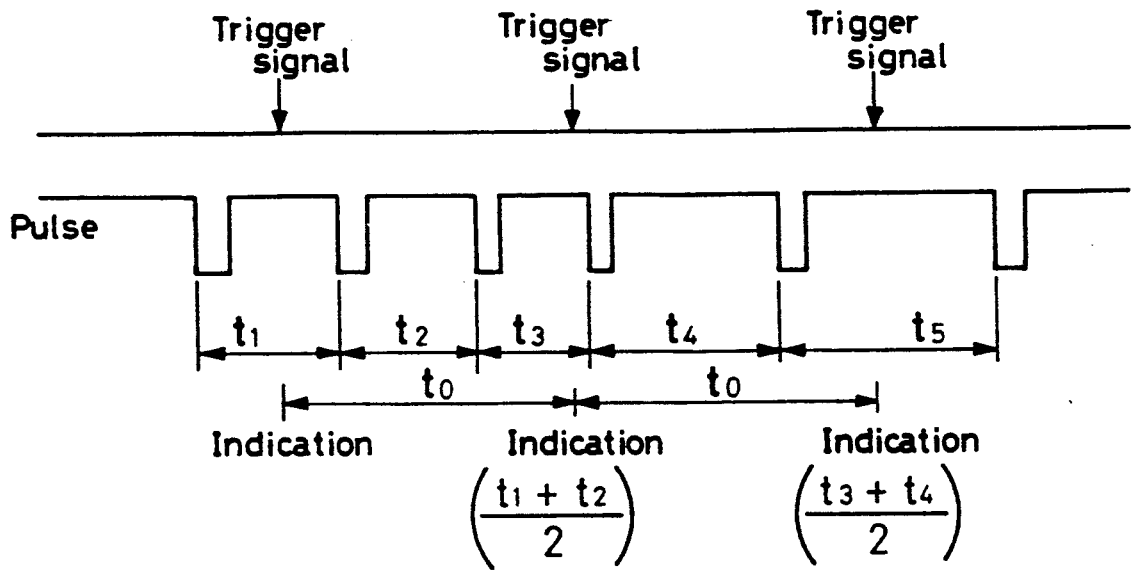
FIG. 3 is a timing chart for entered sensor pulses and the indication of the revolution frequencies in the circuit of FIG. 1.

FIG. 3 is a chart for the timing between an insert from said sensor pulse and the indication of a revolution frequency. At every preset time interval t0, a trigger signal is issued from the indication updating time counter circuit 2. Meanwhile, the adder circuit 5 repeats counting the pulse time intervals t1 through t5 of the sensor pulses every time a trigger signal is entered, starting from "0". The mean value calculation circuit 6 then divides a cumulative value of the pulse time intervals by the number of sensor pulses while outputting the result of dividing to the indication register 8 as a measurement result. In FIG. 3, the revolution frequencies of the revolution body 11 are indicated at $(t1+t2)/2$ and $(t3+t4)/2$ for the first and second periods, respectively according to the results of dividing.

As described above, the revolution frequency of the rotating body is measured and indicated at every preset time to update the indication. Consequently, the indicated values never change so frequently as to be difficult to watch, even when the revolution frequency of the rotating body is high. Thus, the visibility of the indication is very excellent. In addition, even when the rotating body 11 stops revolving, it is discriminated whether a calculation result of the mean value calculation circuit 6 is "0" by means of the zero-revolution detection circuit 10 upon every indication updating time. When it is "0", the indication register 8 together with the counter circuit 3 are forcefully cleared to zero. Therefore, a zero indication is effected when the rotating body stops revolving.

Figure 4:
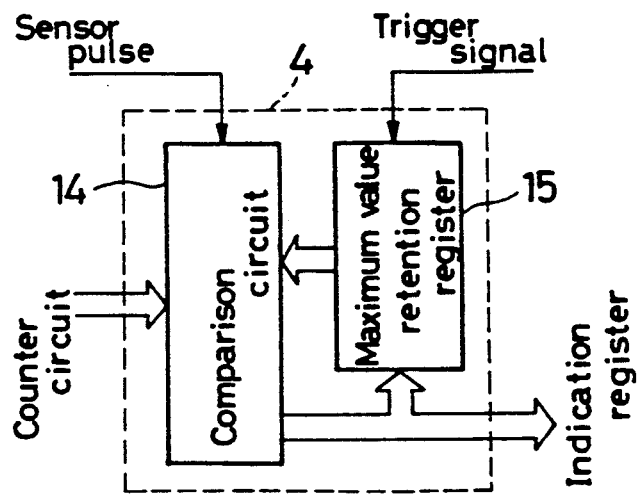
FIG. 4 is the block diagram of another embodiment of the present invention.
Figure 5:
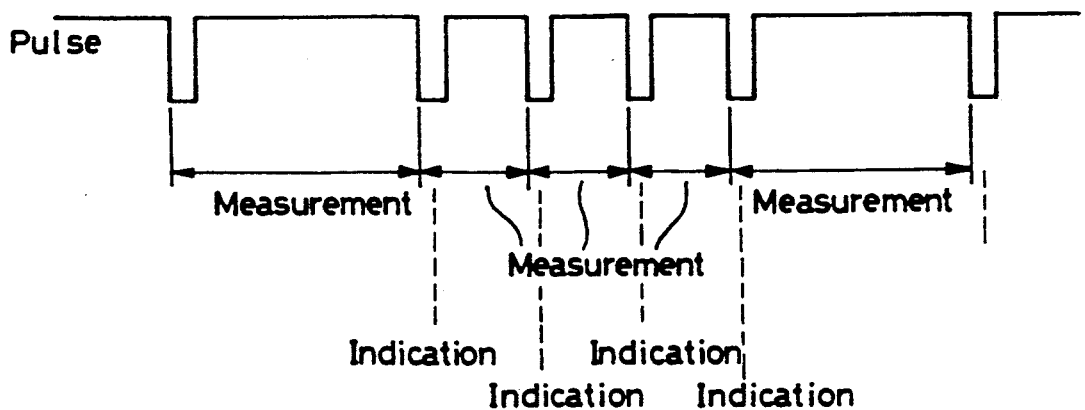
FIG. 5 is a timing chart for entered sensor pulses and the indication of revolution frequencies with a conventional , apparatus known in the prior art.

FIG. 4 shows the block diagram of another embodiment of the present invention. This embodiment incorporates a revolution frequency measurement portion 4 comprising a comparison circuit 14 and a maximum value retention register 15, in which the minimum value of entered pulse time intervals is indicated as a measurement value within said indication updating time period.

More explicitly, the comparison circuit 14 compares the value stored in the maximum value retention register 15 with an input from the counter circuit 3. When the input from the counter circuit 3 is larger, the value in the maximum value retention register 15 is overwritten by the value of the input from the counter circuit 3. Otherwise, the value of the maximum value retention register 15 is maintained. When the indication updating time counter circuit 2 issues a trigger signal, the maximum value retention register 15 outputs the value stored at that time into the indication register 8, as a measurement result. Thereby, the revolution frequency of the rotating body 11 is indicated in the indicator. At the same time, the maximum value retention register 15 itself is also cleared to zero. When the rotating body 11 stops revolving, it is discriminated by means of the zero-revolution detection circuit 10 whether the maximum value retention circuit 15 stores "0". If it stores "0", the counter circuit 3 and the indication register 8 are cleared while indicating a zero. Such a configuration as described above can also brings about the same effect as that of the embodiment of FIG. 1.

Said indication updating time can be freely set while a resolution of the measurement for sensor pulses being increased by making higher the output frequency of the reference frequency oscillator 1.

According to the present invention as described above, the revolution frequency of a rotating body is measured and indicated corresponding to sensor pulses entered within a preset indication updating time period. Therefore, even if the revolution frequency may rise so high, indicated values will not vary so rapidly as adversely affecting the visibility of the indication. In addition, where a zero-revolution detection circuit is added, a zero indication can be effected when the rotating body suddenly stops revolving.

What is claimed is:

1. A frequency indicator adapted to receive revolution sensor output pulse signals indicative of the angular velocity a revolving object and to use the signals to indicate the frequency of revolution of the revolving object, said frequency indicator comprising a) a time based frequency oscillator effective to generate a sequence of time based signals;
   b) first counter circuit means coupled to said time based frequency oscillator and to said revolution sensor output pulse signals, for receiving a first one of said revolution sensor output pulse signals, and thereafter for receiving and counting a number of said sequence of time based signals, and for receiving a second one of said revolution sensor output pulse signals, and thereafter for outputting a signal indicative of the received number of said sequence of signals occurring between every pair of said first and said second sensor output pulse signals;

c) pulse number counter means coupled to said revolution sensor output signals for receiving said revolution sensor output pulse signals and for outputting a signal indicative of the sum of said revolution sensor output pulse signals received by said pulse number counter means;

d) second counter circuit means coupled to said time based frequency oscillator for receiving said sequence of time based signals and for outputting a trigger signal after receiving a predetermined number of said sequence of time based signals and;

e) revolution means coupled to said first counter means, to said pulse number counter means, and to said second counter circuit means, for receiving said trigger signals and in response to said trigger signal determining said frequency of revolution of said revolving object by mathematically combining said output signal from said pulse number means with said output signal from said first counter means, and for outputting and displaying a signal indicative of said determined frequency of revolution.

2. The frequency indicator defined in claim 1, further comprising:

a zero revolution indication means, coupled to said revolution means, for indicating when said revolving object has a rotational velocity of zero.

* * * * *